US007379076B2

(12) United States Patent
Karlov

(10) Patent No.: US 7,379,076 B2
(45) Date of Patent: May 27, 2008

(54) USING PIXEL HOMOGENEITY TO IMPROVE THE CLARITY OF IMAGES

(75) Inventor: Donald D. Karlov, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 895 days.

(21) Appl. No.: 10/891,997

(22) Filed: Jul. 15, 2004

(65) Prior Publication Data

US 2006/0012610 A1 Jan. 19, 2006

(51) Int. Cl.
*G06T 3/20* (2006.01)

(52) U.S. Cl. .................... 345/613; 345/672; 345/469.1

(58) Field of Classification Search ................ 345/613, 345/615; 382/266, 269
See application file for complete search history.

(56) References Cited

U.S. PATENT DOCUMENTS

| | | | | |
|---|---|---|---|---|
| 5,701,365 | A * | 12/1997 | Harrington et al. | 382/212 |
| 5,737,455 | A * | 4/1998 | Harrington et al. | 382/284 |
| 5,886,701 | A | 3/1999 | Chauvin et al. | 345/418 |
| 5,949,428 | A | 9/1999 | Toelle et al. | 345/431 |
| 6,188,385 | B1 * | 2/2001 | Hill et al. | 345/614 |
| 2003/0156646 | A1 | 8/2003 | Hsu et al. | 375/240.16 |
| 2003/0202607 | A1 | 10/2003 | Srinivasan | 375/240.29 |
| 2003/0206592 | A1 | 11/2003 | Srinivasan et al. | 375/240.16 |
| 2003/0206593 | A1 | 11/2003 | Srinivasan et al. | 375/240.16 |
| 2003/0214513 | A1 * | 11/2003 | Brown et al. | 345/611 |
| 2003/0227466 | A1 * | 12/2003 | Stamm et al. | 345/613 |

OTHER PUBLICATIONS

Akimoto, et al., "Improve Pixel Selected Ray Tracing-Fast Image Gene Ration By Adaptive Undersampling," NTT R&D, vol. 39, Issue 5, 1990, pp. 721-728.

Akimoto, et al., "Pixel-Selected Ray Tracing," Computer Graphics and Applications, IEEE, vol. 11, Issue 4, Jul. 1991, pp. 14-22.

Hyeon, et al., "Channel-Dependent Error Diffusion Alogrithm for Dot-Off-Dot Printing," SPIE, vol. 5293, Issue 1, Jan. 2004, pp. 314-321.

* cited by examiner

*Primary Examiner*—Angela Ortiz
*Assistant Examiner*—Edward Martello
(74) *Attorney, Agent, or Firm*—Workman Nydegger

(57) ABSTRACT

The present invention provides for improving image clarity through sub-pixel positioning of the image in a grid space based on pixel homogeneity scores. The pixel homogeneity scores indicating the uniformity of state for sub-pixels produced from an over-sampling of the pixels within the grid space. A representation of an image (or at least a portion thereof) is positioned at various sub-pixel locations with in the grid space, and pixel homogeneity scores are calculated for the various locations. Based on a comparison of the pixel homogeneity scores, a position to display the image is chosen such that image rendering is optimized or at least improved.

35 Claims, 5 Drawing Sheets

USING PIXEL HOMOGENEITY TO IMPROVE THE CLARITY OF IMAGES

CROSS-REFERENCE TO RELATED APPLICATIONS

N/A

BACKGROUND OF THE INVENTION

1. The Field of the Invention

The present invention generally relates to improving the quality of rendering graphical images such as text. More specifically, the present invention relates to improving image rendering through sub-pixel positioning of the image in a grid space based on pixel homogeneity scores.

2. Background and Related Art

Computing technology has transformed the way we work and play. Computing systems now take a wide variety of forms including desktop computers, laptop computers, tablet PC's, personal digital assistance (PDAs), and the like. Even household devices (such as refrigerators, ovens, sewing machines, security systems, and the like) have varying levels of processing capability and thus may be considered computing systems. As time moves forward, processing capabilities maybe incorporated into a number of devices that traditionally did not have such. Accordingly, the diversity of computing systems may likely increase.

Almost all computing systems that interface with human beings use a display to convey information. In many cases, the appeal of the display is considered an important attribute of the computing system. Display of textural information (e.g., Latin-based characters) typically includes processing glyphs that represent characters of a font. A glyph includes control points and instruction for connecting the control points such that an outline of corresponding character can be generated in an arbitrary grid space (e.g., a pixel grid). Often, a character or image will be defined for display at larger size and high resolution. The character can then be mathematically scaled down (or otherwise manipulated) when the character is rendered at smaller sizes and lower resolutions (or as bold, italic, etc.). Thus, a reduced number of descriptions, and potentially one description, for a character (per font) need be stored.

To scale down a character, the location of controlled points can be divided by a scaling factor. For example, to scale a character down by a scaling factor of 10, the coordinates of each control point defining the character (at the higher resolution) can be divided by 10. It may be that control points defining a character for display on a 100×100 grid are to be scaled down for display on a 10×10 grid. Thus, a control point at grid position (50, 30) can be scaled down to a controlled point at grid position (5, 3). Similarly, a control point at grid position (70, 70) can be scaled down to controlled point at grid position (7, 7), etc. According, a smaller outline representing the character may be calculated, and there is a reduced need for storing a number of different sizes of bit-maps for the character.

The small outline can then be analyzed to identify grid locations (e.g., pixels) that are to be turned on and that are to be turned off (a process often referred to as "scan conversion"). One scan conversion algorithm determines if the center of a grid position is in side or outside a resulting scale down outline. When the center of a grid position is inside the scaled down outline the grid position is turned on.

On the other hand when the center of a grid position is outside the scaled down outline the grid position in turned off.

Unfortunately, at times, and especially at lower resolution and smaller font sizes, the results of scan conversion produce an unacceptable representation of a character. Unacceptable character representations can result from rounding errors in scaling down process or from the scan conversion process itself. In order to appropriately render smaller images (e.g., letters of small font size often used by hand-held devices with limited processing power), an over sampling of the image is preformed. This over-sampling results in sub-pixel positioning of a bit-map image and can be used to greatly improve the appearance of a smaller image. For example, as shown in FIG. 1A the grid space 100 is divided up into a numerous amount of pixels 105 for displaying images such as glyph 115. Each pixel is over-sampled to produce a set of sub-pixels 110 for positioning a representation of the image 105 (in this instance the letter "F"). As shown, the over-sampling allows the lower size font glyph to be more accurately positioned within the grid space 100.

Although the use of sub-pixel positioning on pixel-oriented display devices has made it possible to more appropriately display text of smaller images, there are other problems associated with rendering such smaller objects. For example, diagonal lines, or narrow or curvy linier portions of larger images in can cause jaggies or dropout conditions to occur. As such, in order to more appropriately render smaller images hinting and anti-aliasing techniques have been adapted to improve the smooth appearance of smaller objects. Hinting typically ensures that the letter maintains certain attributes, while anti-aliasing techniques allow the pixels that surround the edges of a line (especially those that do not cover a full pixel) to be changed to varying shades of grey or color in order to blend the sharp edge into the back ground.

FIG. 1A illustrates an example of where anti-aliasing techniques can be used to improve image quality. As shown, the vertical edge 120 of glyph 115 is shown as being partially placed over the column of pixels supporting that vertical edge 120. In such instance, various sub-components of those pixels 105 can be turned on or off, as appropriate in order to more appropriately render the vertical edge 120 of glyph 115. For example, various sub-components of red, green and blue can be used at varying intensities to appropriately render glyph 115. Alternatively, the entire pixel 105 can be partially turned on when such sub-components are not available, or other techniques simply turn the pixel fully on or fully off depending on the percentage or fraction of sub-pixels that would be turned on or off.

Although such anti-aliasing techniques allow for smaller fonts or bit-map images to be more accurately rendered, these techniques typically produce fuzzy or jagged edges. As such, as in the case of FIG. 1A, if a small image or glyph 115 is positioned on the grid space such that several of its edges must rely on anti-aliasing techniques, the smaller images or glyphs 115 can become unacceptable or undeterminable. Accordingly, there exists a need to be able to more appropriately position a glyph in order to ensure a uniformity of sub-pixel state within each pixel.

BRIEF SUMMARY OF THE INVENTION

The above-identified deficiencies and draw backs of current systems for rendering graphical images are over come by the present invention. For example, exemplary embodiment provide for improving image clarity for rendering the image at the display device by determining a desired position for the image to be displayed.

Example embodiments provide a processing device coupled to a display device, the display device having a plurality of pixels that can be represented by a grid space with a plurality of sub-pixels from an over-sampling of the image. A representation of an image is generated to be displayed on the display device, the representation configured to be moved by sub-pixel positioning in the grid space. A first pixel homogeneity score is calculated for the representation based on a render of the representation at a first position within the grid space. Further, a second homogeneity score is calculated for the image based on a rendering of the representation at a second position within the grid space. The first and second pixel homogeneity scores indicating the uniformity of the state for sub-pixels within one or more individual pixels in the grid space. Moreover, the first and second pixel homogeneity scores are compared, wherein based on the comparison a determination is made on which position the image should be displayed in order to improve image rendering.

Other example embodiments provide for improving image clarity for rendering an image at a display device by generating a representation of the image to be displayed on display device. The representation configured to be moved by sub-pixel positioning in a grid space. Further, one or more pixels within the grid space maybe scanned for determining a first pixel homogeneity score for the image based on rendering of representation at first position within the grid space. Moreover, at least a portion of the representation is moved to a second position within the grid space. The one or more pixels are then rescanned for determining a second pixel homogeneity score for the image based on a rendering of the representation at a second position within the grid space. The first and second pixel homogeneity scores indicating the uniformity of state for sub-pixels within the one or more pixels scanned. Finally, the first and second pixel homogeneity scores are compared, and based on the comparison, a position for displaying at least a portion of the image corresponding to the at least a portion of the representation is determined in order to improve image rendering.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for improving image rendering or clarity on a display device. The embodiments of the present invention may comprise a special purpose or general-purpose computer including various computer hardware, as discussed in greater detail below.

The present invention provides for computing system that calculates the proper position of an image to be displayed on a display device in order to improve image clarity. More particularly, the present invention provides for the movement of the image within a sub-pixel domain in order to optimize or improve image clarity.

Figure 3:
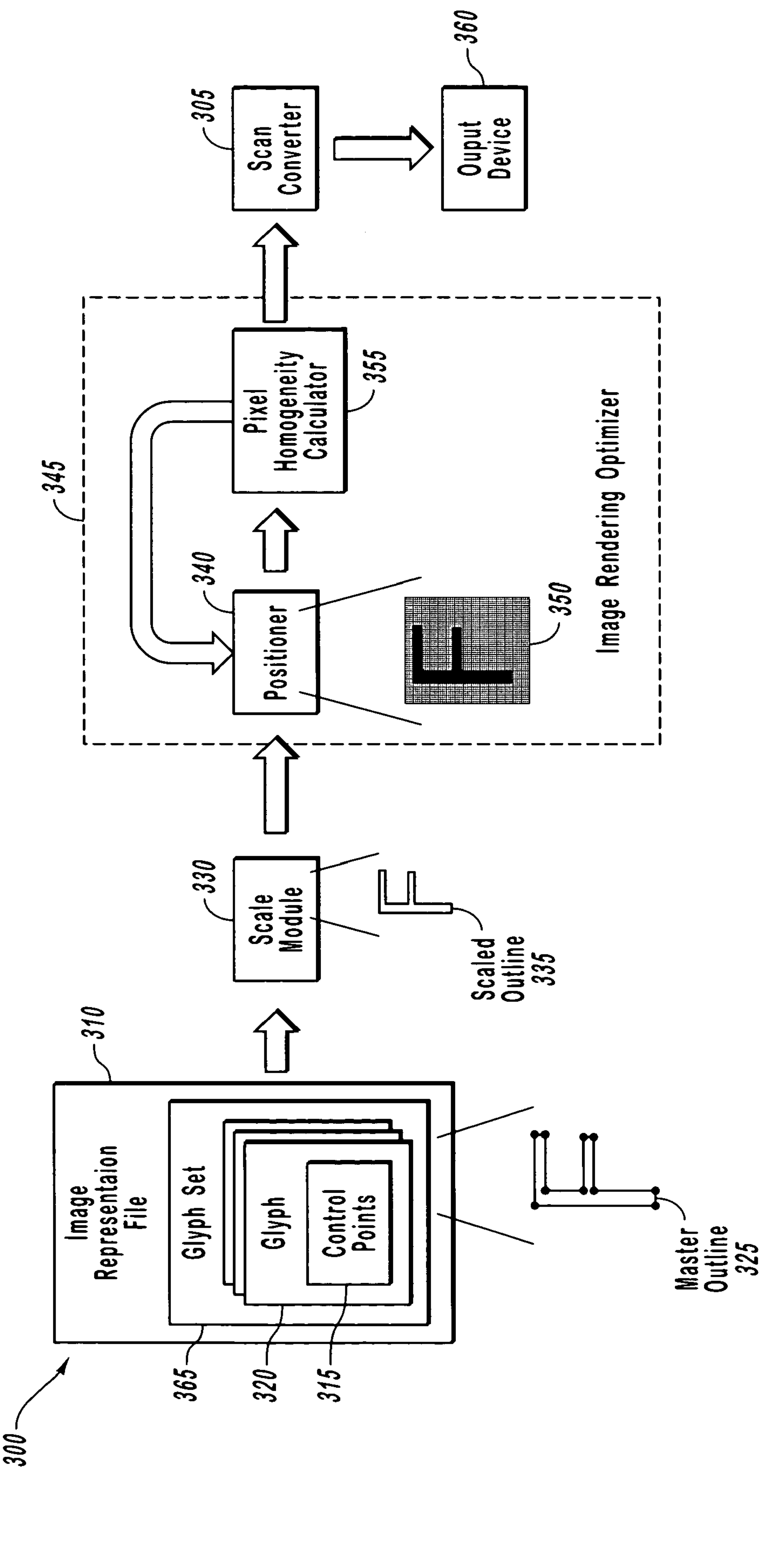
FIG. 3 illustrates a computing system with a image rendering optimizer in accordance with example embodiments of the present invention.

FIG. 3 illustrates an example of a computer system 300 for appropriately rendering graphical images that would otherwise be rendered inappropriately or be rendered in a non-optimal manner. Typically, in response to a command from an application program, a computing system 300 can cause graphical images, e.g., text, to be rendered at output device 360. For example, in response to a selection of the Ariel font in 6 point size, a word processor can subsequently render text using the Ariel font at 6 point size.

A simplified explanation of how the computer system 300 renders images, e.g., text, at output or display device 360 can be described as follows. Image representation file 310 (e.g., stored at or network accessible to computing system 300) includes standardized distances (e.g., stroke weight, distance between glyphs, etc.), reference heights (e.g., capitalization line, subscript line, etc.), and glyph set 365. Glyph set 365 (e.g., a character set) can include a plurality of glyphs 320 (e.g., representing characters). Each glyph 320 in glyph set 365 can be associated with corresponding control points and glyph specific hints for appropriately rendering the glyph. For example, control points 315 and hints (not shown) can be utilized when rendering the glyph 325. It should be noted that although hints have been mentioned in regards to rendering the glyph 325, such implementation is not necessary for improving the image clarity in accordance with the present invention. Accordingly, the use of hints (and other techniques) in rendering a representation of an image or glyph is used for illustrated proposes only and is not meant to limit or otherwise narrow the scope of the present invention unless otherwise claimed.

As previously mentioned, a glyph file 320 can contain control points 315 for representing glyph outline (e.g., mater outline 325) at a master size (e.g., a larger size). For example, glyph 320 may contain control points 315 and hints for glyphs that are to be rendered at 72 point (at a specified resolution). Accordingly, when a font and font size are selected (e.g., as indicated by a display command) scaling module 330 can access image representation file 310 and scale down (or scale up) glyph set 365 for rendering at the selected font size (e.g., 12 point at the specified resolution or at even a different resolution). Scaling module 330 can then output scaled outlines corresponding to glyphs of glyph set 365. For instance, scaled outline 335 corresponds to master outline 325. Also as previously mentioned, scaled glyphs can also include hints, which persist after glyph set 365 is scaled down. Based in part on a selected font size, resolution, and possibly other parameters, such as zooming factor, scaling module 330 can vary the magnitude of the scaling.

Typically, the outputted scaled outline 335—produced through hinting and scaling—would be received by scan converter 305, which analyzes the outline 335 to identify grid locations (e.g., pixels, pixel sub-components, virtual pixels) that are to be turned on and to identify grid locations that are to be turned off (a process that could be referred to as "scan conversion"). Scan converter 305 can output a pixilated representation of one or more glyphs from image representation file 310. Output device 360 can receive the pixilated representation and render it accordingly. Output device 360 can be a monochrome or color output device, such as, a display or printer.

Prior to outputting the image at output device 360, exemplary embodiments provide for an image rendering optimizer 345 which can improve the clarity or sharpness of an image or glyph. The image rendering optimizer 345 improves the rendering of the image by positioning the representation of that image within a sub-pixel domain and determining an optimal or best pixel homogeneity score for rendering the image. The pixel homogeneity score indicates the uniformity of state for sub-pixels within one or more of the over-scaled pixels in the grid space. That position that corresponds to the best pixel homogeneity score can then be used to display the image at the output device 360. The following is an example of a more detailed example embodiment of how image rendering optimizer 345 improves image quality.

The following is a more detailed example embodiment of how image rendering optimizer 345 improves image quality. When the representation of the image is in the grid space 350 it can be determined which sub-pixels within that grid space 350 should be turned on or off. Pixel Homogeneity calculator 355 can then scan each individual pixel, wherein a pixel with either all of its sub-pixel (or sub-components) having a state of on or off would be given a good homogeneity score. In contrast a pixel with half of its sub-pixels (or sub-components) on and the other half of the sub-pixels off will be given a poor homogeneity score since it is undeterminable wither that pixel should be fully on or fully off. A myriad of alternative scores are available for fractions of sub-pixels (or sub-components) on or off for each pixel within the grid space. The homogeneity scores for each pixel are then summed to produce a first pixel homogeneity score for the representation at that position.

Positioner 340 can then move the representation of the image (typically by one or a few sub-pixels, and preferably by less than a full pixel) to a second position within the grid space, wherein a second pixel homogeneity score can be calculated through pixel homogeneity calculator 355 by a similar manner as that described above. The movement can be random; however, a systematic approach such as up one sub-pixel and left one sub-pixel, or down one sub-pixel and right one sub-pixel, and other combinations thereof assists throughput by not producing pixel homogeneity scores for the same position. This process can be continued as necessary and the various homogeneity scores calculated and stored by calculator 355, which can then compare the scores to determine which homogeneity score produces the sharpest image. That position can then be relayed to scan converter 305 along with the scaled outline 355 which can then convert the outline 355 into a pixilated representation of the image for rendering at output device 360.

It should be noted that although the above described computing device 300 for rendering and optimizing clarity of an image has been described with regard to the above isolated components, one would recognize that other configurations are available. For example, scan converter can be included in part of image rendering optimizer 345 since it is available to produce pixilated representation which can then be positioned on grid space 350. As such, the above object orientated representation of example embodiments is used for illustrated purposes only and it is not meant to limit or otherwise narrow the scope of the present invention.

It should also be noted that although the above process for determining a pixel homogeneity score for an image representation scanned all of the pixels and sub-pixels within the grid space 350, there are algorithms commonly known and available to assist in increase throughput. For example, bit-masking or parallel single instruction multiple data (SIMD) techniques can be used, such that every pixel does not have to be scanned individually for every pixel homogeneity score. It is important to note that typically each pixel is scanned and such techniques such as SIMD and bit-masking allow for optimizing this process. It should further be noted that, other techniques for increasing throughput when calculating pixel homogeneity scores for an image representation are also available. Accordingly, the above scanning of all of the pixels and sub-pixels within grid space 350 for determining a pixel homogeneity score was used for illustrative purposes only and is not meant to limit or otherwise narrow the scope of the present invention.

Figure 2:
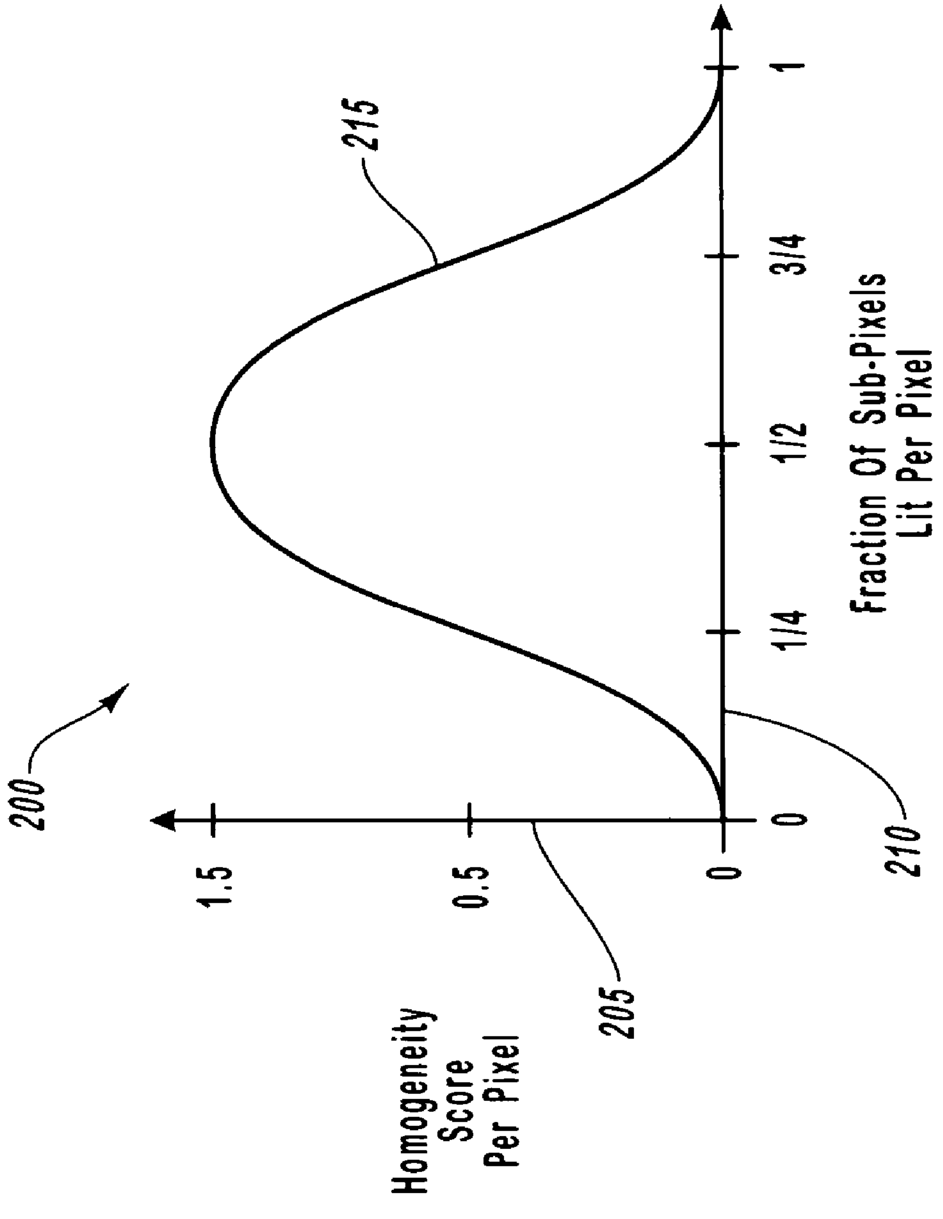
FIG. 2 illustrates a graphically representation of a pixel homogeneity score based on a fraction of sub-pixels lit per pixel in accordance with example embodiments.

FIG. 2 illustrates a graphical representation 200 of the homogeneity scoring of individual pixels within the grid space 350. For example, the vertical axis 205 represents the homogeneity score per pixel, whereas the horizontal axis 210 represents the fraction of sub-pixels lit per pixel. The bell shaped curve 215 defines what homogeneity score should be given for a particular fraction of sub-pixels which are lit. For instance, if all the pixels are lit the fraction of sub-pixel lit would be one which would be given a homogeneity score of zero, as would a fraction of sub-pixels with a fraction of zero. In contrast, if the fraction of sub-pixel lit is one-half the homogeneity score of is the greatest, shown here one. The uniformity of lit pixels on either side of the half way fraction would be given lower scores depending on the shape and slope of the bell shaped curve. It should be noted that although the before mentioned homogeneity score shows that good scores such as those pixels with all of the sub-pixels on or all the sub-pixels off are given a lower homogeneity score than other fractions, the inverse is also available to the present invention. Accordingly, the illustration of what a good homogeneity score is and a poor one are used for illustrative purposes only and is not meant to limit or otherwise narrow the scope of the present invention unless otherwise explicitly claimed.

It should also be noted that although the bell shaped curve shown in FIG. 2 shows a distribution of homogeneity scores, other representations maybe given based on, e.g., the shape and slope of the homogeneity curve. In addition, the homogeneity score can be created on the fly or could be provided in a looked up table. The number of over-samplings within each pixel can also influence the shape of the homogeneity curve. For instance, FIG. 1A illustrates a 4×4 sampling, i.e., four rows and four columns sub-divided in each pixel. There are, however, other configurations, e.g., a 2×2, 2×3, 16×16, or any other type of sub-pixel configuration is available. In fact, the grid space can be defined by simply just rows of sub-pixels or columns of sub-pixels. In such instances, the fraction of sub-pixels lit per pixel is affected, as is the homogeneity scoring for such pixels. As such, the above representation of homogeneity score is used for illustrated purposes only and it is not meant to limit or otherwise narrow the scope of the present invention. In addition, the example representation of sub-pixel over-sampling in both rows and columns is also used for illustrated purposes only and it is not meant to limit or otherwise narrow the scope of the present invention unless otherwise claimed.

Figure 1B:
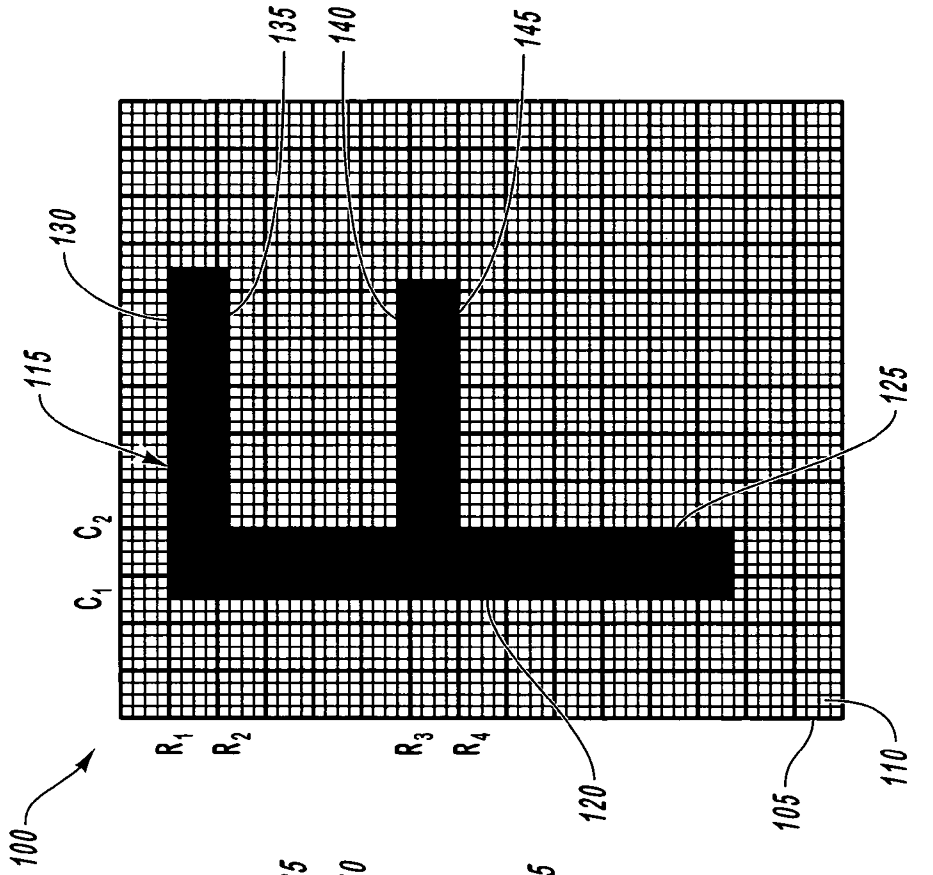
FIG. 1B illustrates an image representation configured to be moved by sub-pixels within a grid space in order to improve a pixel homogeneity score in accordance with example embodiments.
Figure 1A:
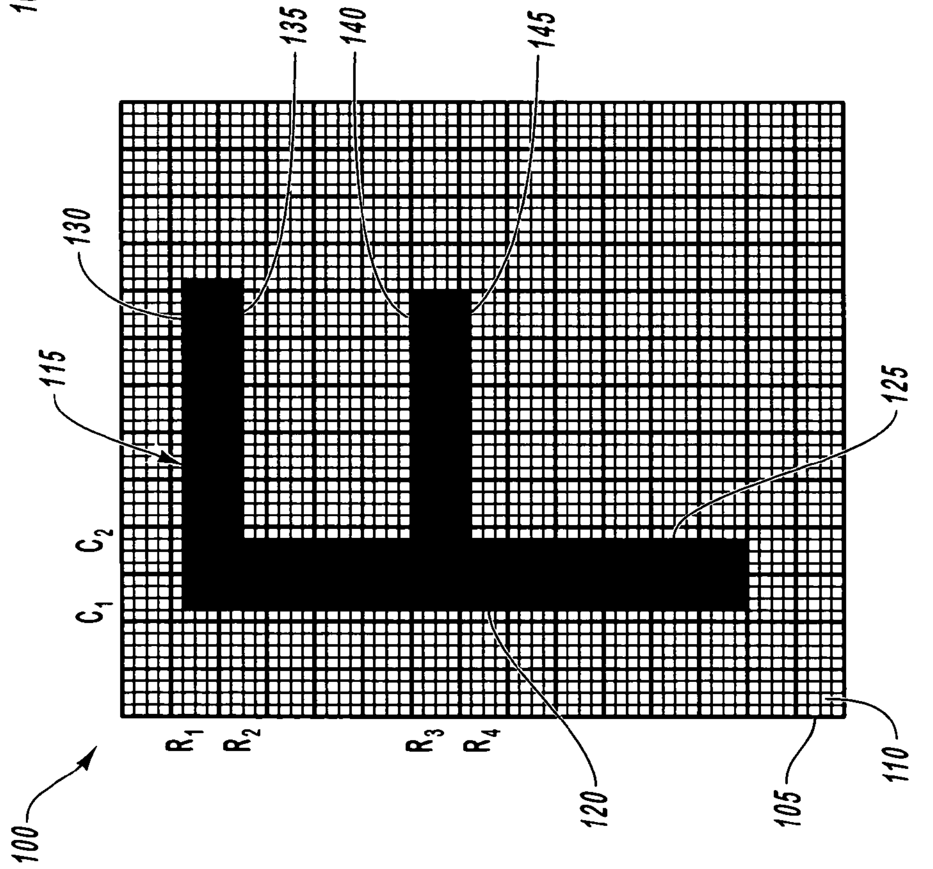
FIG. 1A illustrates the placement of an image representation within a grid space that is over-sample to produce sub-pixels.

FIGS. 1A and 1B illustrate an example of how the sub-pixel positioning of an image representation can greatly increase the sharpness of an image output. As shown in FIG. 1A, image representation 115 is placed in the grid space 100 with vertical edge 120 in the various pixels of column $C_1$. Because the pixels representing vertical edge 120 do not fully cover the pixel space, anti-alias techniques would have to be used. For reasons as those previous described, however, the pixilated output displayed may still render the edge 120 fuzzy, blurry or jagged as previously described. The same would be true for most of the pixels representing vertical edge 125 in column $C_2$, horizontal edge 130 in row $R_1$, horizontal edge 135 in row $R_2$, and horizontal edge 145 in row $R_4$. In fact, the only pixels that would have good homogeneity scores (other then the pixels fully outside the representation) would be the pixels for horizontal edge 140 as shown in row $R_3$, which represent only 5 pixels fully off (or lit as the case may be).

FIG. 1B illustrates a similar representation of image 115 that has been repositioned in the sub-pixel domain by one sub-pixel up and one sub-pixel to the right. As such, it can now be shown that there are substantially more pixels with uniform state throughout the grid space 100. For example, virtually all of the pixel in column $C_2$ will have good homogeneity scores since the vertical edge 125 as been moved over by one sub-pixel. In addition, virtually all of the pixels in row $R_1$ will also have good homogeneity scores since the uniformity of the state for the sub-pixels has now been improved. In addition, the homogeneity scores for pixels in row $R_3$ now remain the same as they were before. Accordingly, by repositioning the image representation within sub-pixel domain the image can be rendered with sharper edges for those edges 125, 145, and 130. Although anti-alias techniques will still be need for rendering edges 135, 140, and 120, the sharpness of the over all image has been improved. In particular, 21 pixels are fully off (or on as the case may be), as compared to only 5 from the previous position in FIG. 1A.

The present invention may also be described in terms of methods comprising functional steps and/or non-functional acts. The following is a description of steps and acts that may be preformed in using the present invention. Usually, functional steps describe the invention in terms of results that are accomplished, were as non-functional acts describe more specific actions for achieving a particular result. Although the functional steps and non-functional acts maybe described or claimed in any particular order, the present invention is not necessarily limited to any particular order of acts and/or steps. Further, the use of acts and/or steps in the recitation of the claims and in the following description of the flow chart for FIG. 4-5 are used to indicate the desired specific use of such terms.

Figure 5:
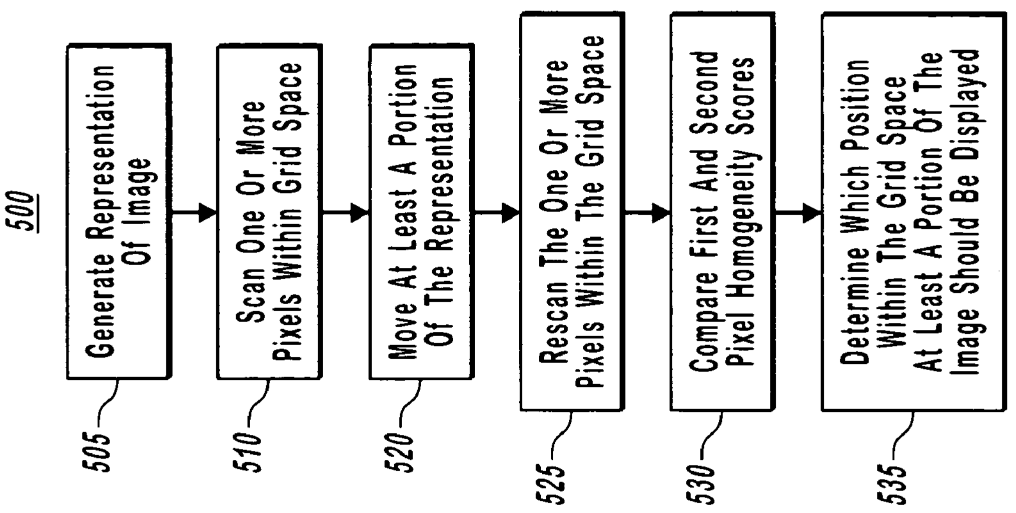
FIG. 5 illustrates another flow chart of a method for improving image clarity in accordance with still other example embodiments.
Figure 4:
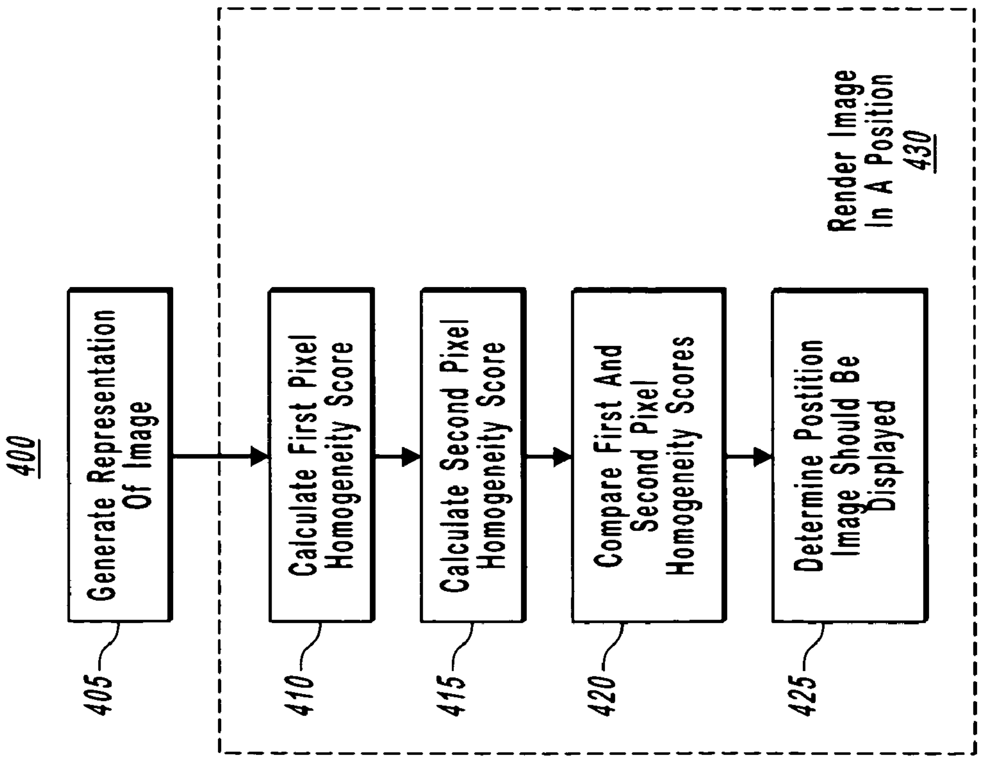
FIG. 4 illustrates a flow chart of a method for improving image clarity when rendering an image at a display device in accordance with example embodiments.

FIGS. 4 and 5 illustrate example flow charts for exemplary embodiments of the present invention. The following description of FIGS. 4 and 5 will occasionally refer to corresponding elements from FIGS. 1A, 1B, 2 and 3. Although reference may be made to a specific element from these Figures, such elements are used for illustrated purposes only and are not meant to limit or otherwise narrow the scope of the present invention unless otherwise explicitly claimed.

FIG. 4 illustrates an example flow chart of a method 400 of improving image clarity at a display device by determining a desired position for the image to be displayed. Method 400 may include the act of generating 405 a representation of an image. For example, representation 115 can be generated, which corresponds to an image to be displayed on a display device. Further, the representation 115 is configured to be moved by sub-pixel positioning 110 in a grid space 100. As previously mentioned, this image could be anyone of a glyph, bit-map, and/or similar graphical object.

Method 400 may also include a function result-oriented step for rendering 430 the image in a position. The position being based on a plurality of pixel homogeneity scores for the representation 115 at different sub-pixel 110 positions within the grid space 100. The step 430 may include the act of calculating 410 a first pixel homogeneity score. For example, pixel homogeneity calculator 355 of image rendering optimizer 345 may be used to calculate the first pixel homogeneity score based on a rendering of the representation 115 at a first position within the grid space 100, 350.

Step 430 may also include the act of calculating 415 a second pixel homogeneity score. For instance, pixel homogeneity calculator 355 of image rendering optimizer 345 may be used to calculate the second homogeneity score also based on a rendering of the representation in 115 at a second position within the grid space 100, 350. The first and second homogeneity scores indicating the uniformity of state for sub-pixels 110 within one or more individual pixels 105 in the grid space 100, 350.

Step 430 may also include an act of comparing 420 the first and second pixel homogeneity scores. Further, step 430 can then determine 425 a position the image should be displayed. For example, image rendering optimizer 345 can store the first and second pixel homogeneity scores calculated by pixel homogeneity calculator 355, and subsequently compare the scores. Based upon the comparison, it can be determined which position the image should be displayed on the output or display device 360 in order to sharpen the image.

Typically, the first position will be within a pixel location of the second position. Further, the first and second pixel homogeneity scores can be calculated using one or more algorithms that improve throughput. For example, the first and second pixel homogeneity scores can be calculated using one or more of bit-masking or parallel single instruction multiple data techniques. Other techniques commonly known in the industry can be used in order to not have to scan through all of the pixels within the grid space 100, 350. More over, the first and second pixel homogeneity scores can be a sum of homogeneity scores for each pixel in the grid space 100. Although the chosen homogeneity score will typically be the lowest score, the inverse of such score is also available in order to determine the position for displaying the image.

Further embodiments also provide for caching or storing the position information within a temporary memory in order to reserve valuable processing resources. That is, when a particular font size has been optimized for a particular glyph or other image, this information can be stored and subsequently used to improve throughput. Further, the information may be a representation of a bell shape disruption of the homogeneity scores for a pixel verses the fraction for a sub-pixels lit within a pixel. Other optimizations can include the use of a lookup table to determine pixel homogeneity scores. Alternatively, the information can be determined on-the-fly.

FIG. 5 illustrates an example flow chart of a method 500 for improving image clarity when rendering an image at a display device by determining a desirable position for at least a portion of the image to be displayed. Method 500 includes an act of generating 505 a representation of an image. For example, computing system 300 can generate a representation of a representation 115 of an image, which is configured to be moved by sub-pixel 110 positioning in a grid space 100, 350.

Method 500 further includes an act of scanning 510 one or more pixels within the grid space. For example, image rendering optimizer 345 can scan one or more pixels 105 within the grid space 100, 350 for determining a first pixel homogeneity score for the representation 115 based on a rendering of the representation 115 at first position within the grid space.

Method 500 also includes an act of moving 520 at least a portion of the representation. For example, positioner 340 may be used to move at least a portion of the representation in grid space 100, 350. For instance, a glyph may be an "o" with one or more diacritical marks over it. As such, positioner 340 may move either the "o" or the one or more diacritical marks in sub-pixel domain to optimize or improve the sharpness of the overall image. Of course, one would recognize that hints can be used in order to ensure that the character quality can be recognized while still optimizing or improving the image clarity. In addition, it should be noted that an image or glyph can have any number of diacritical marks in any orientation around any portion of the image or glyph, and that example embodiments allow for any portion of such images to be individually moved in the sub-pixel domain. Accordingly, the above reference and example of moving the "o" with one or more diacritical marks over it is used for illustrative purposes only, and is not meat to limit or otherwise narrow the scope of the present invention.

Method 500 also includes an act of rescanning 525 one or more pixels within the grid space. For example, image rendering optimizer 345 can be used to rescan grid space 100, 350 after positioner 340 has moved the representation to a second position. The rescanning used to determine a second homogeneity score for the representation based on a rendering of the representation at the second position within the grid space 100. The first and second homogeneity scores indicating the uniformity of state for sub-pixels 110 within the one or more pixels 501 scanned.

Method 500 also includes the act of comparing 530 first and second homogeneity scores. Moreover, Method 500 includes an act of determining 335 which position within the grid space at least a portion of the image should be displayed. For example, image rendering optimizer 345 can store the first and second pixel homogeneity scores calculated by pixel homogeneity calculator 355, and subsequently compare the scores. Based upon the comparison, it can be determined which position the image should be displayed on the output or display device 360 in order to sharpen the image.

The following pseudo-code represents an example of an algorithm that can be executed to implement the above improved image clarity process. The pseudo-code algorithm can be implemented in computer-executable instructions in any of a variety of programming languages. For ease in representing the pseudo-code, the pseudo-code includes an incoming bitmap that is monochrome (although the present invention also applies to color images), which has been rendered to be over-sampled XOver times the width of the desired output character and over-sampled YOver times the height of the desired output character. The algorithm below is general purpose in that non-power of two optimization type instructions, such as bit-masking or parallel SIME, are not required; however, such techniques can be included to optimize the source code. Moreover, the shape of the homogeneity curve can be a lookup table or computed as needed, e.g., on the fly, as shown below.

Inputs:
- Glyph—Bitmap of over-sampled character to be optimized
- Width—Unsigned integer width of output glyph
- Height—Unsigned integer height of output glyph
- XOver—Over-sampling factor in X
- YOver—Over-sampling factor in Y
- Cusp—Real value [0.0, 1.0] of maximal homogeneity
- Power—Real exponent for homogeneity curve
- XLeft—Signed integer specifying maximal displacement left
- XRight—Signed integer specifying maximal displacement right
- YUp—Signed integer specifying maximal displacement up
- YDown—Signed integer specifying maximal displacement down Outputs:
- XOut—Best X shift value
- YOut—Best Y shift value Local variables:
- BestScore—Best homogeneity score so far (0 is best)
- Score—Current score
- XShift—Iterator
- YShift—Iterator
- XLoop—Iterator
- YLoop—Iterator
- XInner—Iterator
- YInner—Iterator
- X, Y—Computed position
- LitPels—Sub pixels turned 'on' in current pixel
- Ratio—Ratio of lit sub-pixels in grid

```
Line 1:   ComputeBestHomogeneity(Glyph, Width, Height, XOver,
          YOver, XLeft, XRight, YUp, YDown, XOut, YOut)
{
Line 2:   BestScore := MAX_INT
Line 3:   YShift := YUp
Line 4:   While (YShift != YDown)
          {
Line 5:       XShift := XLeft
Line 6:       While (XShift != XRight)
              {
```

-continued

```
Line 7:       Score := 0
Line 8:       YLoop := 0
Line 9:       While (YLoop != Width)
              {
Line 10:          Y := (YLoop + YShift) * YOver
Line 11:          XLoop := 0
Line 12:          While (XLoop != Height)
                  {
Line 13:              X := (XLoop + XShift) * XOver
Line 14:              LitPels := 0
Line 15:              YInner := 0
Line 16:              While (YInner != YOver)
                      {
Line 17:                  XInner := 0
Line 18:                  While (XInner != XOver)
                          {
Line 19:                      If(Glyph[XInner][YInner] != 0)
Line 20:                          LitPels := LitPels + 1
                          }
                      }
Line 21:              Ratio := LitPels/(XOver * YOver)
Line 22:              If (Ratio < Cusp)
                      {
Line 23:                  Ratio := (Ratio/Cusp) ** Power
                      }
Line 24:              Else
                      {
Line 25:                  Ratio := ((1.0 - Ratio)/(1.0 -
                          Cusp)) ** Power
                      }
Line 26:                  Score := Score + XOver * YOver -
                          Ratio * XOver * YOver
Line 27:          XLoop++;
                  }
Line 28:      YLoop++;
              }
Line 29:      If (Score < BestScore)
              {
Line 30:          BestScore := Score
Line 31:          XOut := XShift
Line 32:          YOut := YShift
              }
Line 33:  XShift++;
          }
Line 34: YShift++;
         }
}
```

By way of brief explanation of the above code, lines 1-3 are variable declarations, with line 2 declaring a starting point for the pixel homogeneity score. Lines 4-6 shift the glyph by maximum displacements. Lines 9-20, 27 and 28 essentially scan and determine state for each sub-pixel by pixel, column and each column in the grid space. Lines 21-25 determine a homogeneity score per pixel, whereas line 26 determines the overall pixel homogeneity score for the glyph in that particular position. Lines 29-32 determine if the pixel homogeneity score is the best score, whereas if it is the glyph's position is saved. Finally, lines 33 and 34 advance the glyph to the next position to repeat the above algorithm. This algorithm can be repeated as necessary to optimize or improve image quality.

Example embodiments of the present invention can include computer-executable instructions for implementing the algorithm represented in the pseudo-code example. For instance, computer system 300, which could be any of a number of systems, such as a server, client, router, etc., may include computer-executable instructions for implementing Lines 1-34 or the above example pseudo-code.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
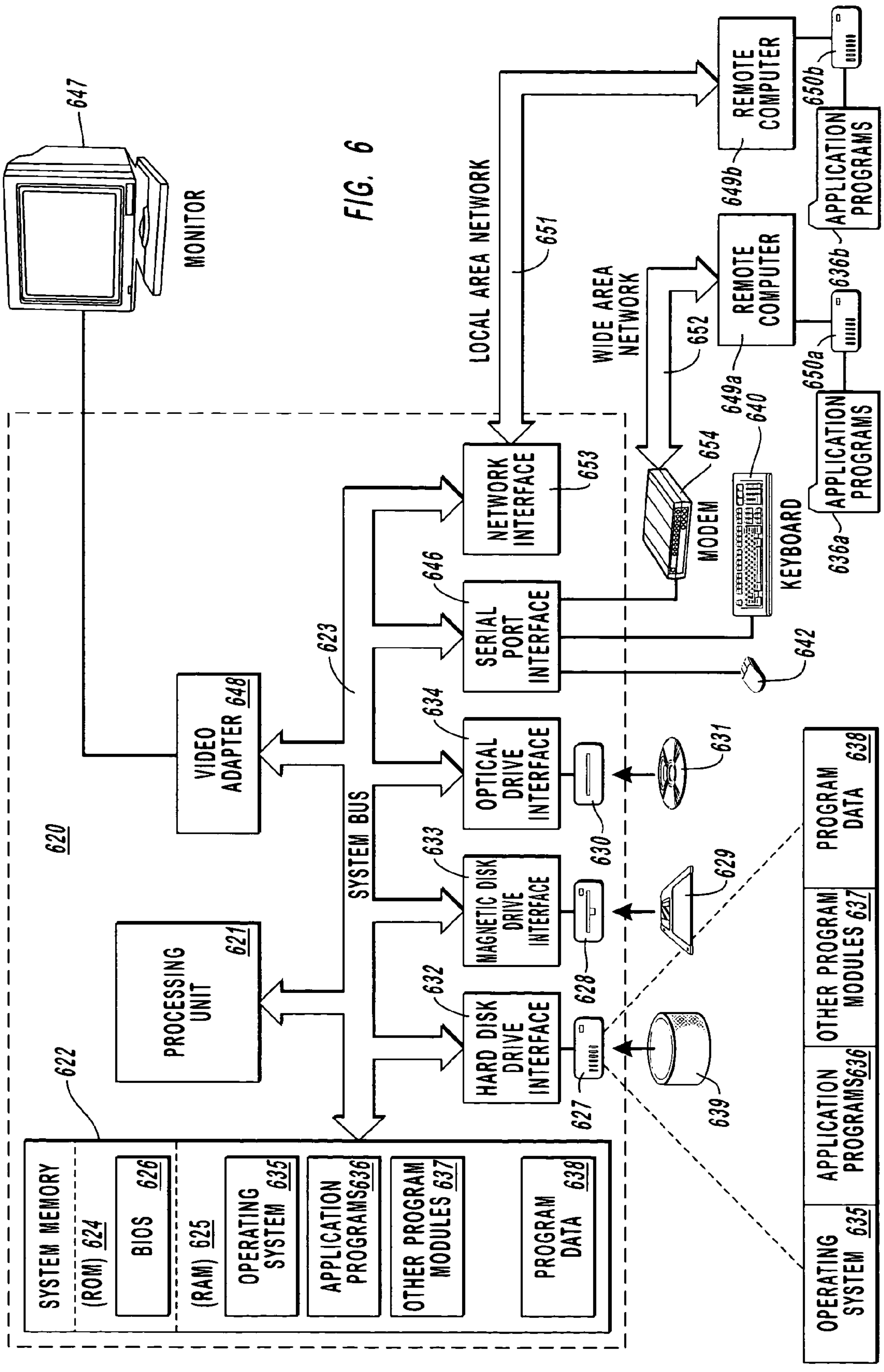
FIG. 6 illustrates an example system that provides a suitable operating environment for present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe. computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649*a* and 649*b*. Remote computers 649*a* and 649*b* may each be another personal computer, a server, a router, a network PC, a peer device or other common network node, and typically include many or all of the elements described above relative to the computer 620, although only memory storage devices 650*a* and 650*b* and their associated application programs 636*a* and 636*b* have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a processing device coupled to a display device, a method of improving image clarity at the display device by determining a desired position for the image to be displayed, the method comprising acts of:

generating a representation of an image to be displayed on a display device, the representation configured to be moved by sub-pixel positioning in a grid space;

calculating a first pixel homogeneity score for the representation based on a rendering of the representation at a first position within the grid space;

calculating a second pixel homogeneity score for the representation based on a rendering of the representation at a second position within the grid space, the first and second pixel homogeneity scores indicating the uniformity of state for sub-pixels within one or more individual pixels in the grid space;

comparing the first pixel homogeneity score to the second pixel homogeneity score; and based on the comparison, determining which position the image should be displayed on the display device in order to sharpen rendering of the image.

2. The method of claim 1, wherein the first position is within a pixel location of the second position.

3. The method of claim 1, wherein the first and second pixel homogeneity scores are calculated using one or more algorithms that improve throughput.

4. The method of claim 3, wherein the first and second pixel homogeneity scores are calculated using one or more of bit-masking or parallel single instruction multiple data techniques.

5. The method of claim 1, wherein the first and second pixel homogeneity scores are a sum of homogeneity scores for each pixel within the grid space.

6. The method of claim 1, wherein the first pixel homogeneity score is lower than the second pixel homogeneity score, and wherein the first position is determined to be the position within the grid space to display the image.

7. The method of claim 1, wherein multiple pixel homogeneity scores are compared with the first and second pixel homogeneity scores in determining which position within the grid space to display the image.

8. The method of claim 1, wherein the determined position for the image is stored in a temporary memory.

9. The method of claim 1, wherein a portion of information used to calculate pixel homogeneity scores is stored in a look-up table, the information representing a bell shaped distribution of the homogeneity score for a pixel verses the fraction of sub-pixels lit within a pixel.

10. In a processing device coupled to a display device, a method of improving image clarity at the display device by determining a desired position for the image to be displayed, the method comprising:

an act of generating a representation of an image to be displayed on a display device, the representation configured to be moved by sub-pixel positioning in a grid space;

a step for rendering the image in a position based on a plurality of pixel homogeneity scores for the representation at different sub-pixel locations within the grid space, the pixel homogeneity scores indicating the uniformity of state for sub-pixels within one or more individual pixels in the grid space.

11. The method of claim 10, wherein the different sub-pixel locations are less than a full diagonal length of a pixel from one another.

12. The method of claim 10, wherein the plurality of pixel homogeneity scores are approximated using one or more algorithms that improve throughput.

13. The method of claim 12, wherein the plurality pixel homogeneity scores are calculated using one or more of bit-masking or parallel single instruction multiple data techniques.

14. The method of claim 10, wherein the plurality of pixel homogeneity scores are a sum of homogeneity scores for each pixel within the grid space.

15. The method of claim 10, wherein a position that produces a lowest homogeneity score from among the plurality of pixel homogeneity scores is the position for rendering the image.

16. The method of claim 10, wherein the position for rendering the image is stored in a temporary memory for future reference.

17. The method of claim 10, wherein a portion of information used to calculate the plurality of pixel homogeneity scores is stored in a look-up table, the information representing a bell shaped distribution of the homogeneity score for a pixel verses the fraction of sub-pixels lit within a pixel.

18. In a processing device coupled to a display device, a method of improving image clarity at the display device by determining a desired position for the image to be displayed, the method comprising acts of:

- generating a representation of an image to be displayed on a display device, the representation configured to be moved by sub-pixel positioning in a grid space;
- scanning one or more pixels within the grid space for determining a first pixel homogeneity score for the representation based on a rendering of the representation at a first position within the grid space;
- moving at least a portion of the representation to a second position within the grid space;
- rescanning the one or more pixels within the grid space for determining a second pixel homogeneity score for the representation based on a rendering of the representation at the second position within the grid space, the first and second pixel homogeneity scores indicating the uniformity of state for sub-pixels within the one or more pixels scanned;
- comparing the first pixel homogeneity score to the second pixel homogeneity score; and
- based on the comparison, determining which position the at least a portion of the image corresponding to the at least a portion of the representation should be displayed on the display device in order to sharpen the image.

19. The method of claim 18, wherein the first position is within a pixel location of the second position.

20. The method of claim 18, wherein the first and second pixel homogeneity scores are calculated using one or more algorithms that improve throughput.

21. The method of claim 20, wherein the first and second pixel homogeneity scores are calculated using one or more of bit-masking or parallel single instruction multiple data techniques.

22. The method of claim 18, wherein the first and second pixel homogeneity scores are a sum of homogeneity scores for each pixel within the grid space.

23. The method of claim 18, wherein the first pixel homogeneity score is lower than the second pixel homogeneity score, and wherein the first position is determined to be the position within the grid space to display the image.

24. The method of claim 18, wherein multiple pixel homogeneity scores are compared with the first and second pixel homogeneity scores in determining which position within the grid space to display the at least a portion of the image.

25. The method of claim 18, wherein the determined position for the at least a portion of the image is stored in a temporary memory.

26. The method of claim 18, wherein a portion of information used to calculate pixel homogeneity scores is stored in a look-up table, the information representing a bell shaped distribution of the homogeneity score for a pixel verses the fraction of sub-pixels lit within a pixel.

27. In a processing device coupled to a display device, a computer program product for implementing a method of improving image clarity at the display device by determining a desired position for the image to be displayed, the computer program product comprising one or more computer readable media having stored thereon computer executable instructions that, when executed by a processor, can cause the distributed computing system to perform the following:

- generate a representation of an image to be displayed on a display device, the representation configured to be moved by sub-pixel positioning in a grid space;
- calculate a first pixel homogeneity score for the representation based on a rendering of the representation at a first position within the grid space;
- calculate a second pixel homogeneity score for the representation based on a rendering of the representation at a second position within the grid space, the first and second pixel homogeneity scores indicating the uniformity of state for sub-pixels within one or more individual pixels in the grid space;
- compare the first pixel homogeneity score to the second pixel homogeneity score; and
- based on the comparison, determine which position the image should be displayed on the display device in order to sharpen the image.

28. The computer program product of claim 27, wherein the first position is within a pixel location of the second position.

29. The computer program product of claim 27, wherein the first and second pixel homogeneity scores are approximated using one or more algorithms that improve throughput.

30. The computer program product of claim 29, wherein the first and second pixel homogeneity scores are calculated using one or more of bit-masking or parallel single instruction multiple data techniques.

31. The computer program product of claim 27, wherein the first and second pixel homogeneity scores are a sum of homogeneity scores for each pixel within the grid space.

32. The computer program product of claim 27, wherein the first pixel homogeneity score is lower than the second pixel homogeneity score, and wherein the first position is determined to be the position within the grid space to display the image.

33. The computer program product of claim 27, wherein multiple pixel homogeneity scores are compared with the first and second pixel homogeneity scores in determining which position within the grid space to display the image.

34. The computer program product of claim 27, wherein the determined position for the image is stored in a temporary memory.

35. The computer program product of claim 27, wherein a portion of information used to calculate pixel homogeneity scores is stored in a look-up table, the information representing a bell shaped distribution of the homogeneity score for a pixel verses the fraction of sub-pixels lit within a pixel.

* * * * *

UNITED STATES PATENT AND TRADEMARK OFFICE

CERTIFICATE OF CORRECTION

PATENT NO. : 7,379,076 B2
APPLICATION NO. : 10/891997
DATED : May 27, 2008
INVENTOR(S) : Donald D. Karlov It is certified that error appears in the above-identified patent and that said Letters Patent is hereby corrected as shown below:

In column 7, line 53, after "representation" insert -- 115 --.

Signed and Sealed this
Twelfth Day of July, 2011

David J. Kappos
*Director of the United States Patent and Trademark Office*